(12) United States Patent
Nagashima et al.

(10) Patent No.: US 8,310,535 B2
(45) Date of Patent: Nov. 13, 2012

(54) SURVEYING SYSTEM

(75) Inventors: Terukazu Nagashima, Itabashi-ku (JP); Hajime Shinozaki, Itabashi-ku (JP); Yoshikatsu Miyao, Itabashi-ku (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 734 days.

(21) Appl. No.: 12/381,778

(22) Filed: Mar. 17, 2009

(65) Prior Publication Data

US 2009/0244277 A1    Oct. 1, 2009

(30) Foreign Application Priority Data

Mar. 25, 2008    (JP) .................................. 2008-077217

(51) Int. Cl.
*H04N 7/18*    (2006.01)
(52) U.S. Cl. ....... 348/135; 348/240.3; 345/2.3; 345/173
(58) Field of Classification Search .................. 348/135, 348/240.3; 345/2.3, 173
See application file for complete search history.

(56) References Cited

U.S. PATENT DOCUMENTS

| | | | |
|---|---|---|---|
| 4,682,218 A | 7/1987 | Kaneko | |
| 4,717,251 A | 1/1988 | Wells et al. | |
| 5,055,666 A | 10/1991 | Miyahara | |
| 5,212,889 A | 5/1993 | Lysen | |
| 6,034,722 A | 3/2000 | Viney et al. | |
| 6,504,602 B1 | 1/2003 | Hinderling | |
| 6,859,269 B2 | 2/2005 | Ohtomo et al. | |
| 7,127,822 B2 | 10/2006 | Kumagai et al. | |
| 7,391,907 B1* | 6/2008 | Venetianer et al. | 382/224 |
| 7,564,488 B2 | 7/2009 | Kumagai et al. | |
| 2001/0043335 A1* | 11/2001 | Norita et al. | 356/601 |
| 2005/0172503 A1* | 8/2005 | Kumagai et al. | 33/290 |
| 2005/0207621 A1 | 9/2005 | Murai et al. | |
| 2008/0085032 A1* | 4/2008 | Cerosaletti et al. | 382/100 |

FOREIGN PATENT DOCUMENTS

| | | |
|---|---|---|
| CN | 2589276 Y | 12/2003 |
| CN | 100343623 C | 10/2007 |
| EP | 1 293 755 A1 | 3/2003 |

(Continued)

OTHER PUBLICATIONS

Chinese communication dated Sep. 9, 2010 in corresponding foreign application (CN200910124698.5).

(Continued)

*Primary Examiner* — Thuong Nguyen
(74) *Attorney, Agent, or Firm* — Nields, Lemack & Frame, LLC

(57) ABSTRACT

The present invention provides a surveying system, which comprises a surveying device 1 having a function for tracking a target 13 and a remote control device 16 for remotely controlling the surveying device on a target side, wherein the surveying device comprises measuring units 21, 25 and 27, image pickup units 22 and 23, a first radio unit 33, and a first control arithmetic unit 29, and the remote control device comprises a second radio unit 37, a second control arithmetic unit 35, a second display unit 18, and a second operation input unit 20, wherein the surveying device transmits an image data acquired at the image pickup unit to the remote control device via the radio unit, and the remote control device receives the image data via the second radio unit and the second display unit displays the image in inversion display based on the image data.

7 Claims, 6 Drawing Sheets

FOREIGN PATENT DOCUMENTS

| | | |
|---|---|---|
| JP | 2-281380 A | 11/1990 |
| JP | 3-24971 B | 4/1991 |
| JP | 5-5308 A | 1/1993 |
| JP | 6-186036 A | 7/1994 |
| JP | 7-19874 A | 1/1995 |
| JP | 8-43098 A | 2/1996 |
| JP | 9-159449 A | 6/1997 |
| JP | 9-322141 A | 12/1997 |
| JP | 11-14357 A | 1/1999 |
| JP | 11-194018 A | 7/1999 |
| JP | 11-325883 | 11/1999 |
| JP | 11-325891 A | 11/1999 |
| JP | 2000-275044 A | 10/2000 |
| JP | 2003-75154 A | 3/2003 |
| JP | 2003-185436 A | 7/2003 |
| JP | 2005-351700 A | 12/2005 |

OTHER PUBLICATIONS

International Search Report mailed Dec. 16, 2003 in international application No. PCT/J1303/11193 (now US Patent 7,127,822).
Japanese Communication, with English translation, mailed Jul. 17, 2012 in corresponding Japanese patent application No. JP 2008-077217.

* cited by examiner

SURVEYING SYSTEM

BACKGROUND OF THE INVENTION

The present invention relates to a surveying system. In particular, the invention relates to a surveying system for tracking a target.

As a surveying device for measuring a distance, a horizontal angle, and an elevation angle, a type of surveying device with a tracking function has been known in the past. In this type of surveying device, an object reflector (a target) such as a corner cube is collimated by a collimating telescope, which is provided on the surveying device. A tracking light is projected from the collimating telescope, and when the target is moved, a reflection light from the target is received, and the target is automatically tracked.

In this type of the surveying device with tracking function, an operator needs not be on a surveying device side. The surveying operator performs an operation on a target side, and a measurement can be carried out by a single operator. For instance, the surveying operator holds a remote control device, and a target installed on a pole or the like is held by the surveying operator. The surveying device is operated by the remote control device, and the operation is started. The surveying operator installs a target at each measuring point. An instruction is given to the laser surveying device from the remote control device, and the measurement is carried out. The surveying operator moves the target sequentially from one measuring point to another. The surveying device detects a reflection light from the target and automatically tracks the target.

Normally, the remote control device comprises a display unit. A guidance information is transmitted from the laser surveying device to the remote control device, and the guidance information for the measurement is displayed on the display unit. For instance, when the measurement on a measuring point has been completed, a coordinate of the next measuring point, a distance to the next measuring point, or a moving direction to the next measuring point or the like are displayed.

The operator moves according to the guidance information. Then, a target is installed at the next measuring point, and the measurement is carried out.

However, even when the distance and the direction to the measuring point are displayed on the display unit, it is difficult to sensually identify in which direction and how far the measuring point is moved. As a result, there is a problem that a working efficiency is considerably influenced by a skill and an experience of the surveying operator.

SUMMARY OF THE INVENTION

It is an object of the present invention to make it possible to perform a remote control operation from a remote control device by a single operator on a laser surveying device and to carry out a measurement with high efficiency without being influenced by a skill and an experience of the surveying operator.

To attain the above object, the present invention provides a surveying system, which comprises a surveying device having a function for tracking a target and a remote control device for remotely controlling the surveying device on a target side, wherein the surveying device comprises measuring units, image pickup units, a first radio unit, and a first control arithmetic unit, and the remote control device comprises a second radio unit, a second control arithmetic unit, a second display unit, and a second operation input unit, wherein the surveying device transmits an image data acquired at the image pickup unit to the remote control device via the radio unit, and the remote control device receives the image data via the second radio unit and the second display unit displays the image in an inversion display based on the image data.

Also, the present invention provides the surveying system as described above, wherein the second display unit can select a normal vision display or an inversion display. Further, the present invention provides the surveying system as described above, wherein the second display unit indicates a horizontal direction of a coordinate of a survey setting point by a vertical straight line of infinity in an image displayed. Also, the present invention provides the surveying system as described above, wherein a mark to indicate a direction of an elevation angle is displayed on the straight line. Further, the present invention provides the surveying system as described above, wherein a collimation correcting direction of the surveying device is displayed as a mark of triangular shape protruding from edge side of an image to the center. Also, the present invention provides the surveying system as described above, wherein a size of collimation correcting amount of the surveying device is adjusted to match a height of a vertex of the protruding mark.

The present invention provides a surveying system, which comprises a surveying device having a function for tracking a target and a remote control device for remotely controlling the surveying device on a target side, wherein the surveying device comprises measuring units, image pickup units, a first radio unit, and a first control arithmetic unit, and the remote control device comprises a second radio unit, a second control arithmetic unit, a second display unit, and a second operation input unit, wherein the surveying device transmits an image data acquired at the image pickup unit to the remote control device via the radio unit, and the remote control device receives the image data via the second radio unit and the second display unit displays the image in inversion display based on the image data. As a result, an operating direction in the image concurs with an operating direction of the surveying device as recognized by the operator when the surveying device is operated by the remote control device. This makes it possible to perform the operation in simple and easy manner, and to improve a working efficiency.

Also, the present invention provides the surveying system as described above, wherein the second display unit can select normal vision display or inversion display. As a result, it is possible to select an image, which matches the direction of the operator's line of sight of the operator, and also to improve working efficiency.

Further, the present invention provides the surveying system as described above, wherein the second display unit indicates a horizontal direction of a coordinate of a survey setting point by a vertical straight line of infinity in an image displayed. As a result, a horizontal direction can be recognized even when the survey setting point is deviated from a field angle. Also, because a mark to indicate an elevation angel direction is displayed on the straight line, a direction to correct the elevation angle can also be recognized, and a working efficiency is improved.

Also, the present invention provides the surveying system as described above, wherein a collimation correcting direction of the surveying device is displayed as a mark of triangular shape protruding from edge side of an image to the center. As a result, a correction of the collimating direction of the horizontal angle and the elevation angle can be visually recognized, and the working efficiency is improved.

Further, the present invention provides the surveying system as described above, wherein a size of collimation correcting amount of the surveying device is adjusted to match a height of a vertex of the protruding mark. As a result, it is possible to recognize an amount of the correction of the collimating direction and the working efficiency is improved.

DETAILED DESCRIPTION OF THE PREFERRED EMBODIMENT

A description will be given below on a best mode for carrying out the present invention by referring to the attached drawings.

Figure 1:
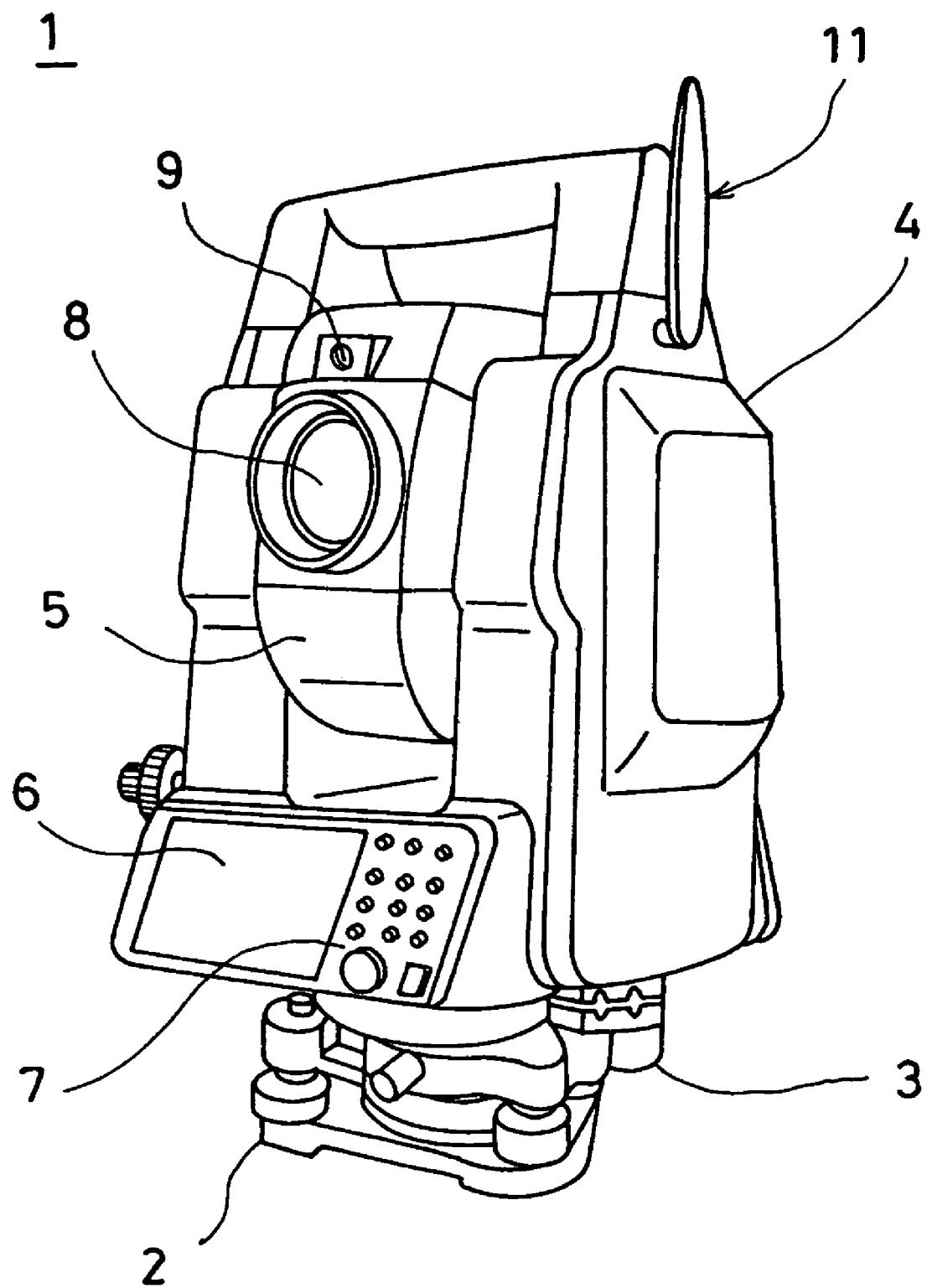
FIG. 1 is a perspective view of an example of a surveying device used in a surveying system according to the present invention.

FIG. 1 shows an example of a surveying device 1, which constitutes a surveying system of the present invention. The surveying device used in this case is a total station, for instance. A pulsed laser beam is projected to a measuring point. A pulsed reflection light from the measuring point is received, and a distance measurement is performed for each pulse. The results of the distance measurements are averaged, and the distance is measured with high accuracy.

The surveying device 1 primarily comprises a leveling unit 2 installed on a tripod (not shown), a base unit 3 mounted on the leveling unit 2, a frame unit 4 rotatably mounted around an elevation axis center on the base unit 3, and a telescope unit 5 rotatably mounted around a horizontal axis center on the frame unit 4.

The frame unit 4 comprises a first display unit 6 and a first operation input unit 7. The telescope unit 5 comprises a first telescope 8 for collimating an object to be measured and a first image pickup unit 22 (to be described later) for acquiring an image in a collimating direction via an optical system of the first telescope 8. Further, the telescope unit 5 comprises a second image pickup unit 23 (to be described later) for acquiring an image in the collimating direction or in an approximately collimating direction via a second telescope 9, which has a lower magnification than the magnification of the first telescope 8 and a wider visual field than the visual field of the first telescope 8, and via an optical system of the second telescope 9. As the first image pickup unit 22 or the second image pickup unit 23, for instance, a digital camera for outputting the taken image as a digital image signal is used.

An image pickup element provided in the first image pickup unit 22 and the second image pickup unit 23 are CCD, CMOS, etc., for instance, which are aggregate of pixels. A position of the received pixel can be identified on the image pickup element, and the field angle is obtained from the position of the pixel.

A communication means, e.g. a radio unit 11, is disposed on the frame unit 4. The radio unit 11 can transmit the result of the distance measurement, an image data acquired at the first image pickup unit 22 or the second image pickup unit 23, or a guidance information relating to the measurement can be transmitted to a remote control device (to be described later).

Figure 2:
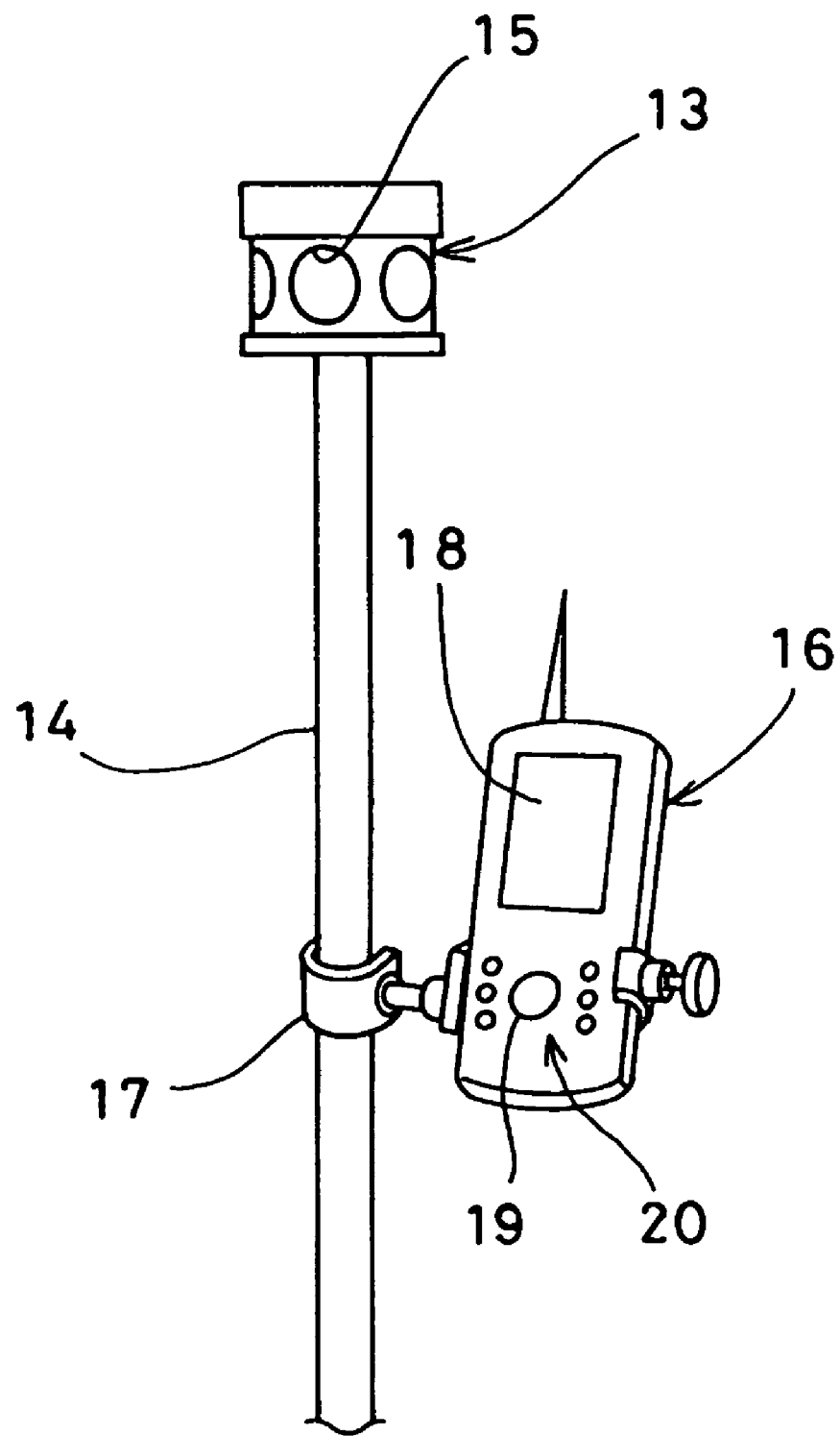
FIG. 2 is a perspective view showing a target and a remote control device used in the surveying system of the present invention.

FIG. 2 shows a target and the remote control device used in the surveying system of the present invention.

FIG. 2 shows a case where a target 13 is erected on an upper end of a pole 14. The target 13 has a plurality of prisms 15 so that a tracking light from the surveying device 1 can be received from directions over total circumference and the lights can be reflected.

The remote control device 16 is mounted on the pole 14 via a fixture 17. Even when the surveying operator holds the pole 14 by one hand, the other hand is free to use for an operation.

The remote control device 16 comprises a second display unit 18 designed as a touch panel, a second operation input unit 20 including an operation button 19 and the like, and a communication means such as a radio means (to be described later). The surveying device 1 and the remote control device 16 can transmit and receive data via the radio means, and the measurement data, the image data, and the guidance information transmitted from the surveying device 1 can be displayed on the second display unit 18.

Figure 3:
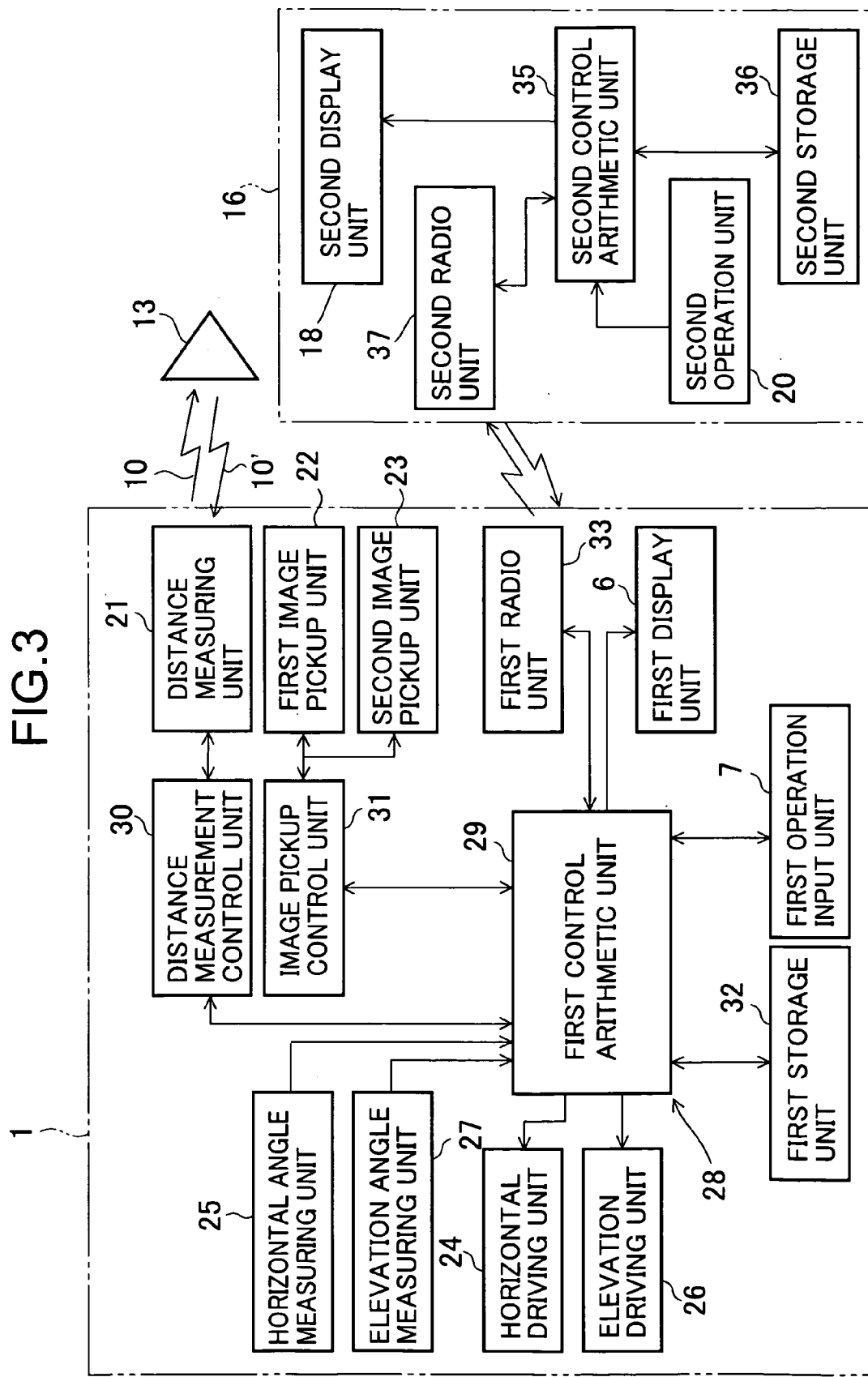
FIG. 3 is a block diagram to show approximate arrangement of an embodiment of the present invention.

Now, referring to FIG. 3, a description will be given an approximate arrangement of the system.

First, a description will be given on the surveying device 1.

The telescope unit 5 is incorporated with a distance measuring unit 21 having a distance measuring light optical system. The distance measuring unit 21 comprises a distance measuring light optical system, which shares the optical system of the first telescope 8. A distance measuring light 10, which is a pulsed light, is projected by the distance measuring light optical system. A reflection light 10' from the target 13 is received, and an electro-optical distance measurement is performed to the target 13. The electro-optical distance measurement can be performed in two mode, a prism measurement mode and a non-prism measurement mode.

A horizontal drive unit 24 for rotating the frame unit 4 in the horizontal direction is disposed on the frame unit 4. Also, a horizontal angle measuring unit 25 for detecting a horizontal rotation angle of the frame unit 4 with respect to the base unit 3 and for detecting a horizontal angle in the collimating direction is provided. On the frame unit 4, an elevation drive unit 26 for rotating the telescope unit 5 around the horizontal axis center is provided, and an elevation angle measuring unit 27 for detecting an elevation angle of the telescope unit 5 and for measuring an elevation angle in the collimating direction is disposed. The distance measuring unit 21, the horizontal angle measuring unit 25, and the elevation angle measuring unit 27 make up together a measuring unit.

A control device 28 is incorporated in the frame unit 4. The control device 28 controls the driving of the horizontal drive unit 24 and the elevation drive unit 26 and directs (collimates) the telescope unit 5 in a predetermined direction by rotating the telescope unit 5. Further, the control device 28 performs a scanning over a predetermined range, and switches over an optical magnification of the first telescope 8. Or, the control device 28 acquires an image in the collimating direction by the first image pickup unit 22 and the second image pickup unit 23, and the control device 28 switches over the images of the first image pickup unit 22 and the second image pickup unit 23. Further, the control device 28 controls the switchover of an electrical processing magnification of the image acquired, and acquires an image with magnification as required. Further, the control device 28 controls the distance measuring unit 21 and measures a distance to the target 13.

The control device 28 primarily comprises a first control arithmetic unit 29, a distance measurement control unit 30, an image pickup control unit 31, a first storage unit 32, a first radio unit 33, the first display unit 6, the first operation input unit 7, etc.

The results of the measurements from the distance measuring unit 21, the horizontal angle measuring unit 25 and the elevation angle measuring unit 27 are inputted to the first control arithmetic unit 29. The measurements are carried out on the distance, a horizontal angle and an elevation angle, and the results of the measurements are stored in the first storage unit 32 via the first control arithmetic unit 29 and are displayed on the first display unit 6.

The first storage unit 32 has a program storage area for storing various types of programs, and a data storage area where a setting value and data such as the measurement results are stored. In the program storage area, various types of programs are stored. These programs include: a calculation program required for the measurement, an image processing program for performing an image processing (to be described later), an image display program for converting the image data to a video signal or for performing a display, an inversion display (mirror display), etc., a communication program for transmitting and receiving the measurement data and the image data, a prism measurement program for selecting measuring points from the processed image and for executing the distance measurement on the selected measuring point (target 13), an non-prism measurement program for carrying out the measurements at points other than the target 13, a measurement mode switchover program for switching the measurement mode and for acquiring a measurement condition suitable for the mode, a sequence program for tracking the measuring point, a search program for searching the target 13 when the operator misses the target before starting the measurement, and other programs.

The image pickup control unit 31 switches over the first image pickup unit 22 and the second image pickup unit 23, controls an acquisition of the image by the first image pickup unit 22 and the second image pickup unit 23, and performs a processing on the acquired image data. The image pickup control unit 31 can calculate a position of the target 13 based on a photodetection signal from a photodetection element when the reflected light 10' enters the photodetection element of the first image pickup unit 22 and the second image pickup unit 23.

The image pickup control unit 31 converts the photodetection signal from the photodetection element to a video signal and can display the picked-up image on the first display unit 6 at real time.

The first radio unit 33 transmits the measurement data such as data on the measured distance, data on the measured angle, etc., the image data, and the video signal to the remote control device 16 and receives an operation instruction from the remote control device 16.

Next, a description will be given on the remote control device 16.

The remote control device 16 primarily comprises a second control arithmetic unit 35, a second storage unit 36, a second radio unit 37, the second display unit 18, the second operation input unit 20, etc.

In the second storage unit 36, various programs are stored. These programs include: a communication program for performing the radio communication with the surveying device 1, a control command program for converting an operation from the second operation input unit 20 and from the second display unit (touch panel) 18 to a control command signal and for transmitting the control command signal to the surveying device 1 via the second radio unit 37, an image display program for displaying the measurement data or the video signal from the surveying device 1 to the second display unit 18, and a coordinate position calculating program for calculating a position on the second display unit 18. The second storage unit 36 has a data storage unit on a part of the second storage unit 36, and the measurement data and the image data associated with the measurement data are stored in the data storage unit. When necessary, a measurement operation supplementary data such as a measurement schedule, a measured topographical data, a measuring position, etc. are stored. When the operator calls via the second operation input unit 20, an operation supplementary information is displayed on the second display unit 18.

A description will be given below on an operation of the surveying system according to the present invention.

As a preparation for the measurement, a coordinate value of a survey setting point are inputted to the surveying device 1. The coordinate value of the survey setting point may be inputted from the first operation input unit 7, or data stored in a recording medium such as a memory card may be read in the surveying device 1. The operator performs a surveying operation by holding the pole 14 shown in FIG. 2, on which the remote control device 16 and the target 13 are mounted.

When the measurement is started, an image of the wide field angle (scenery) picked up by the second image pickup unit 23 via the second telescope 9, and the image is displayed on the first display unit 6. The image picked up by the second image pickup unit 23 is transmitted to the remote control device 16 and is displayed on the second display unit 18.

Figure 4:
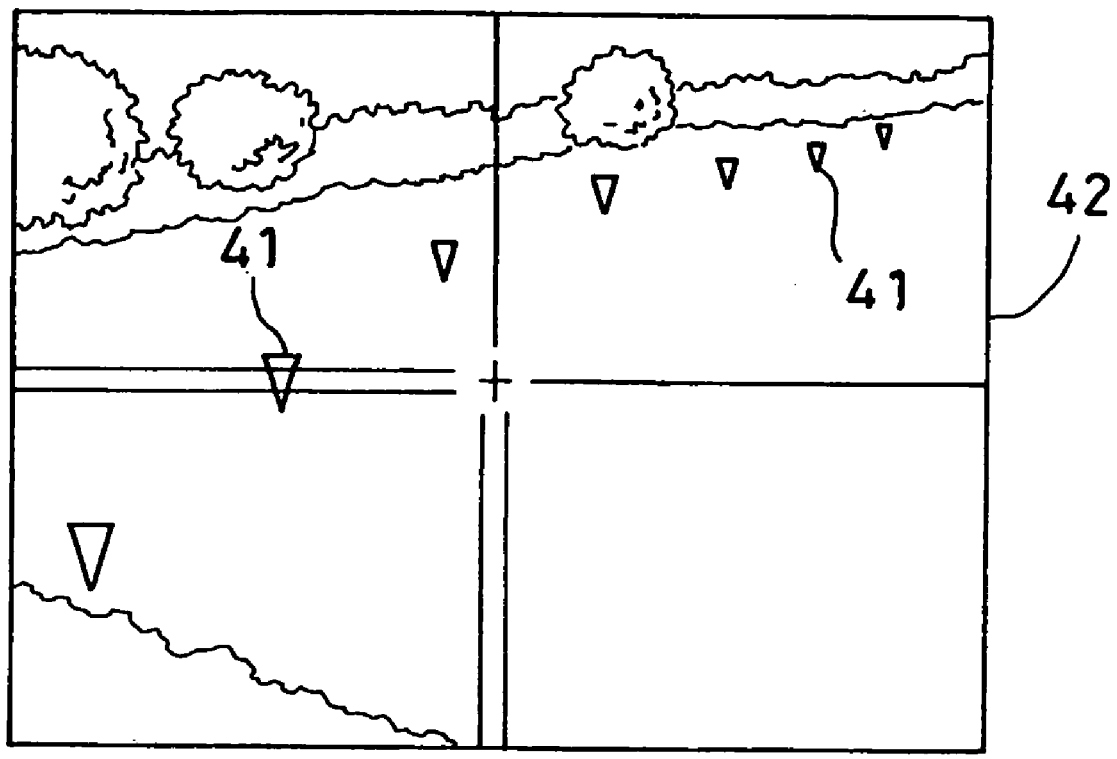
FIG. 4 is an explanatory drawing to show an example of display in a second display unit of the remote control device.

As shown in FIG. 4, the inputted a coordinate position is shown by a plot mark 41. With the increase of the distance from the surveying device 1, the plot mark 41 is displayed smaller.

The surveying operator confirms the plot mark 41 in the image, estimates an approximate position of the survey setting point, and moves while confirming the moving direction on the image. When the operator moves for a considerable distance toward the survey setting point, the operator moves with his back facing to the surveying device 1, and the direction of visual field of the surveying operator is the same as the direction of visual field of the second telescope 9. Accordingly, the image picked up by the first image pickup unit 22 is directly displayed on the second display unit 18 (normal vision display).

Next, when the surveying operator comes nearer to the survey setting point, directs to the surveying device 1, and performs an operation to determine a position where the pole 14 is to be set, the screen is switched over to a guidance screen.

Figure 5:
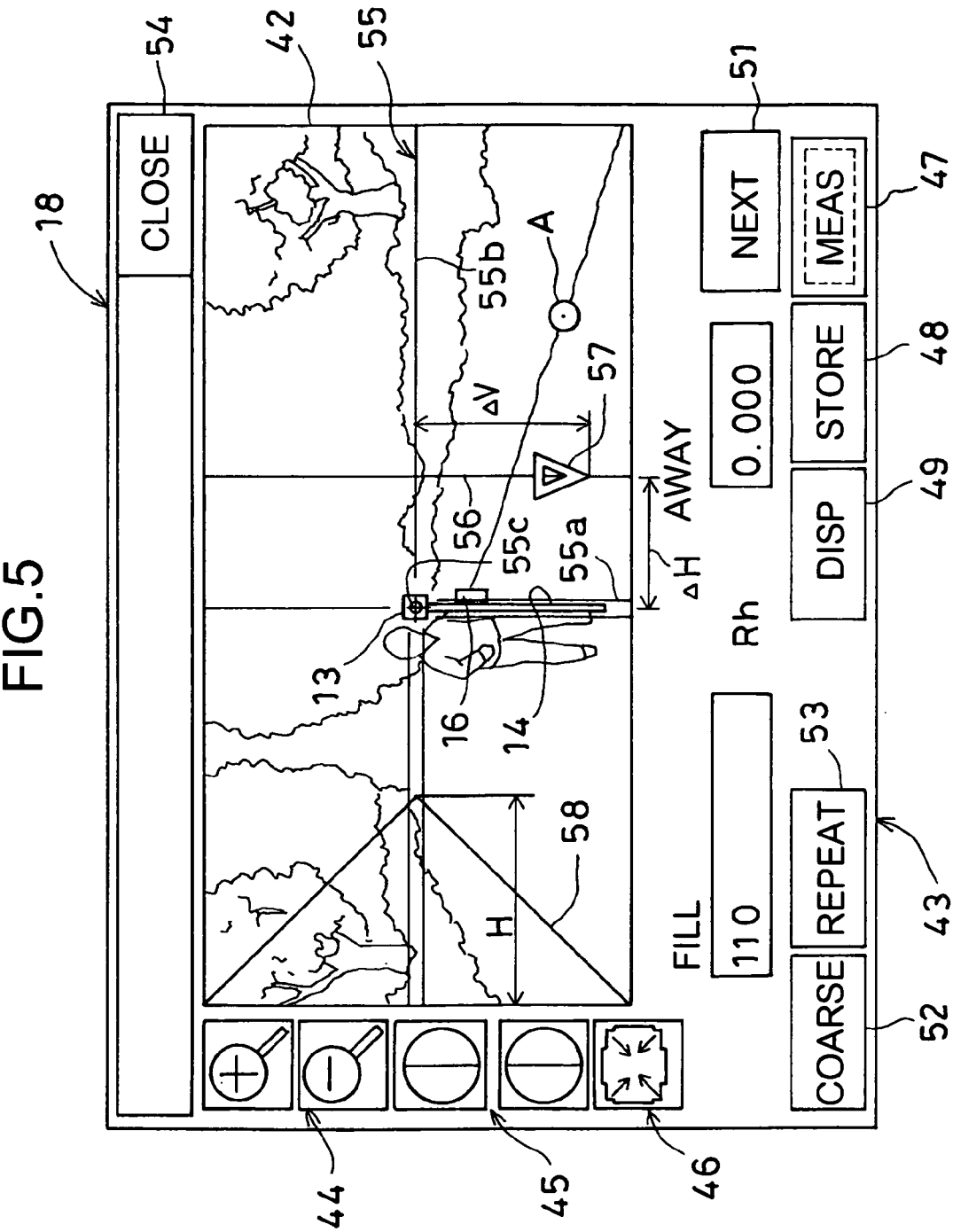
FIG. 5 is an explanatory drawing to show an example of display in a second display unit of the remote control device.

FIG. 5 shows the guidance screen.

When the screen is switched over to the guidance screen, the image pickup unit is switched over unless other instruction is given, and an image taken by the first image pickup unit 22 is acquired. The image taken by the first image pickup unit 22 is a telescopic image, which is taken via the first telescope 8, and it is in such magnification, that final positioning of the pole 14 (i.e. the target 13) can be determined.

A mirror image is displayed on the guidance screen. That is, the image taken by the first image pickup unit 22 is displayed by an inversion in a left-to-right direction on the second display unit 18 (inversion display). When the surveying operator performs an operation while the operator is facing to the surveying device 1, the direction of visual field of the surveying operator is reverse to the direction of visual field of the first image pickup unit 22. Therefore, in case of a normal vision, the left-to-right direction of the image displayed on the second display unit 18 is reverse to the actual left-to-right direction as recognized by the surveying operator. When a mirror image is displayed on the guidance screen, the left-to-right direction of the image on the second display unit 18 agrees in appearance with the actual left-to-right direction as recognized by the surveying operator. Accordingly, no sense of incongruity is felt when the operator performs an operation according to the image displayed on the second display unit 18, i.e. according to the guidance on the image.

Next, referring to FIG. 5, a description will be given on a function of the guidance displayed on the second display unit 18.

The second display unit 18 is a touch panel. An image is displayed on it, and an operation can be performed from the screen by using a touching area or the like. The image displayed on the second display unit 18 has an image display area 42 where the image data transmitted from the surveying device 1 is displayed and an operation button area 43. In the operation button area 43, there are: a size-enlargement and size-reduction button 44 for increasing and decreasing a magnification of the image, a luminance and brightness adjusting button 45, an image pickup unit switchover button 46 to switch over to the first image pickup unit 22 and to the second image pickup unit 23, a measurement starting button 47, a data recording button 48 for storing the measurement results, a display switchover button 49 for switching over the display of the second display unit 18, e.g. to switch over the display to the display of FIG. 4, a survey setting change button 51 for changing the survey setting point, a measurement accuracy switchover button 52 for switching a measurement accuracy, i.e. to a coarse measurement or a precision measurement, a repeating button 53 for repeatedly carrying out the measurement, a termination button 54 to be operated when the measuring operation is terminated.

On the image display area 42, an image transmitted from the surveying device 1, i.e. an image taken by the first image pickup unit 22, or an image taken by the second image pickup unit 23 is displayed, and various guidance functions are displayed.

On the image display area 42, a reticle 55 is displayed. An intersection 55c of a longitudinal reticle 55a and a transverse reticle 55b is a collimating position of the first telescope 8. One-half of each of these reticles is composed of dual lines so that the position indicated by the longitudinal reticle 55a and the transverse reticle 55b can be easily aligned with the collimating position in the image.

Based on the coordinate data of the survey setting point as inputted in the image in advance, a horizontal position display line 56 to indicate a horizontal direction (left-to-right direction in the image) is displayed as an infinity line in the vertical direction. The coordinate data of the survey setting point is not indicated by a point because it is not possible to display on the image in case where the survey setting point is located in a direction deviated from the field angle provided in the first telescope 8 and the second telescope 9 (hereinafter, a description will be given on the case of the first telescope 8). By displaying as an up-to-bottom infinity line, the horizontal direction is displayed on the image display area 42 regardless of the elevation angle in the collimating direction, and a working efficiency is improved.

A position of the elevation angle may be indicated on the horizontal position display line 56. The position of the elevation angle may be displayed as an elevation angle display mark 57, which is in form of an inverted isosceles triangle as shown in the figure, so that the lower vertex of the elevation angle display mark 57 indicates the position of the elevation angle. A distance Δv between the transverse reticle 55b and the lower vertex of the elevation angle display mark 57 is given as a deviation in the collimating direction with respect to the coordinate of the survey setting point. In case the elevation angle display mark 57 concurs with the intersection 55c, the elevation angle display mark 57 may be erased from the image.

The target 13 is a point, which is shifted upward from the actual position of the survey setting point by a distance equal to the length of the pole 14. The position of the elevation angle as indicated by the elevation angle display mark 57 may be determined by taking the deviation of the position between the target 13 and the survey setting point into account.

Next, when the collimating direction is extensively deviated from the field angle, the horizontal position display line 56 cannot be displayed in the image. Then, a horizontal direction display mark 58 in triangular shape is displayed, which is formed from a side edge of each of side lines on left or right of the image display area 42 toward the center of the image.

The horizontal direction display mark 58 is to indicate a direction to correct the collimating direction in the first telescope 8. Referring to FIG. 5, the collimating direction is deviated leftward in the image with respect to the direction toward the survey setting point, and it is necessary to rotate the first telescope 8 in a rightward direction. Then, the horizontal direction display mark 58 appears on left side edge of the image display area 42, indicating a rotating direction of the first telescope 8. It may be so arranged that a height H of the vertex of the horizontal direction display mark 58 is changed to match the size of the angle to be corrected and correction can be made visually so that the judgment can be made whether correction should be made in larger extent or in smaller extent.

Display can be made similarly in case of the correction of the elevation angle. That is, an elevation direction display mark (not shown) is displayed, which forms a triangular shape toward the center of the image from one of the side edges in an up-to-bottom direction of the image display unit area. For instance, when the collimating direction of the first telescope 8 is to be corrected downward, an elevation direction display mark in triangular shape is displayed, which is protruding downward from the upper edge of the image display area 42.

In accordance with the guidance information as displayed on the image display area 42, the collimating direction of the first telescope 8 is corrected. When the collimating direction is aligned with the target 13, the prism measurement is carried out by operating the measurement starting button 47. The measurement result thus obtained is recorded by operating the data recording button 48.

A scenery as seen from the first telescope 8 is displayed on the image display area 42. By indicating an arbitrary point in the image, e.g. a point A, by using a touch pen, the non-prism measurement is performed on the point A. Therefore, the data in the neighborhood of the survey setting point can be easily acquired.

Figure 6:
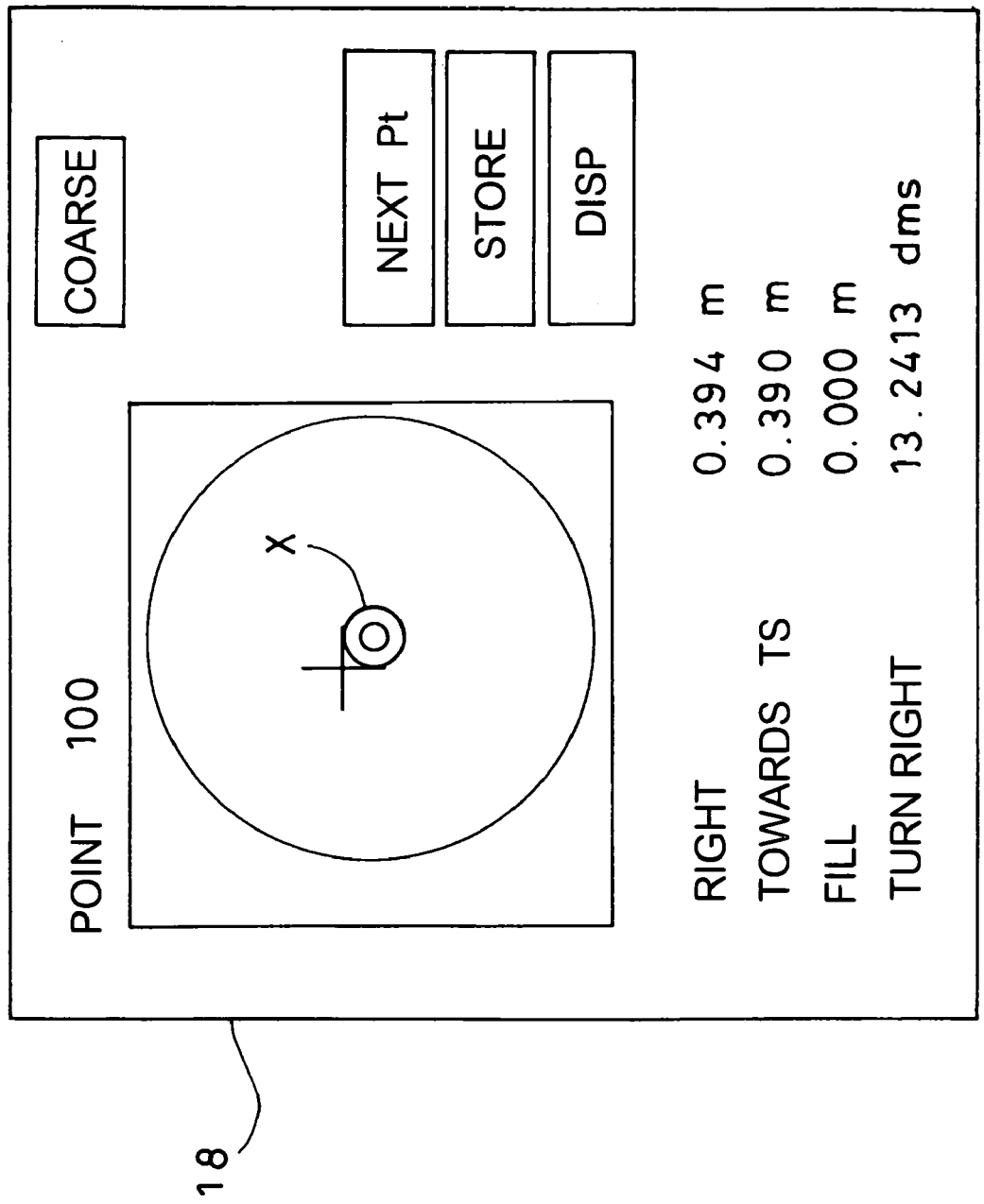
FIG. 6 is an explanatory drawing to show an example of display in a second display unit of the remote control device.

When the operator is moving the target 13, the surveying device 1 is measuring by tracking the target 13, and the position of the target 13 is measured at real time. Therefore, when it is wanted to schematically find the positional relation between the target 13 and the survey setting point, the display switchover button 49 is operated. A schematical plan view is displayed on the second display unit 18. The position of the target 13 is displayed by a mark + in the image, and the survey setting point is shown in a circle indicated by a mark x (see FIG. 6).

When the measurement of the survey setting point is completed as originally planned, the survey setting change button 51 is operated, and it is shifted to the measuring operation on the next survey setting point. Thus, the measurement is performed sequentially on one survey setting point after another.

The invention claimed is:

1. A surveying system, comprising
a surveying device having a telescope for aligning a target to be installed on a collimating direction of survey setting point and a function for tracking said target by receiving a reflection light for said target by said telescope and a remote control device provided on said target side and for remotely controlling the surveying device,
wherein said surveying device comprises measuring units, image pickup units for collimating said target and acquiring an image in the collimating direction, a first radio unit, and a first control arithmetic unit, and
said remote control device comprises a second radio unit, a second control arithmetic unit, a display unit, and an operation input unit,
wherein said surveying device transmits an image data acquired at the image pickup unit to said remote control device via said radio unit, and said remote control device receives said image data via said second radio unit, and said display unit displays the image in an inversion display based on said image data, wherein said inversion display represents a left-to-right mirror image and said display unit displays a vertical straight line in said image which represent a horizontal direction of a coordinate of said survey setting point and wherein said display unit is a touch panel and a distance is measured on a point designated in an image displayed on said display unit.

2. The surveying system according to claim 1, wherein said display unit can select a normal vision display or an inversion display.

3. The surveying system according to claim 1, wherein a mark to indicate a direction of an elevation angle is displayed on said straight line.

4. The surveying system according to claim 1, wherein a collimation correcting direction of said surveying device is displayed as a mark of triangular shape protruding from edge side of an image to the center.

5. The surveying system according to claim 4, wherein a size of collimation correcting amount of said surveying device is adjusted to match a height of a vertex of said protruding mark.

6. The surveying system according to claim 1, wherein said image pickup unit comprises a first image pickup unit for acquiring an image of high magnification, and a second image pickup unit for acquiring an image of low magnification, wherein an image of a wide field angle acquired by the second image pickup unit is displayed on said display unit, a plot mark to indicate a survey setting point is displayed in said image of the wide field angle, and said plot mark is displayed in smaller size as a distance from the surveying device is increased.

7. The surveying system according to claim 1, wherein said remote control device can display a schematical plan view instead of an image acquired by said image pickup unit on said display unit, and planar positional relation between the target and the survey setting point is displayed on said schematical plan view.

* * * * *

UNITED STATES PATENT AND TRADEMARK OFFICE
CERTIFICATE OF CORRECTION

| | |
|---|---|
| PATENT NO. | : 8,310,535 B2 |
| APPLICATION NO. | : 12/381778 |
| DATED | : November 13, 2012 |
| INVENTOR(S) | : Nagashima et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 763 days.

Signed and Sealed this
Twelfth Day of February, 2013

Teresa Stanek Rea
*Acting Director of the United States Patent and Trademark Office*